(12) United States Patent
Koenig et al.

(10) Patent No.: US 8,819,617 B1
(45) Date of Patent: Aug. 26, 2014

(54) SYSTEM AND METHOD FOR PROVIDING ACCESS TO DATA IN A PLURALITY OF SOFTWARE DEVELOPMENT SYSTEMS

(71) Applicant: FMR LLC, Boston, MA (US)

(72) Inventors: David Koenig, Chestnut Hill, MA (US); Byron Gregg, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/032,000

(22) Filed: Sep. 19, 2013

(51) Int. Cl.
*G06F 9/44* (2006.01)

(52) U.S. Cl.
USPC ............................ 717/101; 717/102; 717/120

(58) Field of Classification Search
USPC ................................. 717/100–105, 120–123
IPC ................................. G06F 8/65,8/10, 8/20, 8/70
See application file for complete search history.

(56) References Cited

U.S. PATENT DOCUMENTS

| | | | |
|---|---|---|---|
| 6,915,507 B1 * | 7/2005 | Kaler et al. .................... | 717/103 |
| 6,938,240 B2 * | 8/2005 | Charisius et al. ............. | 717/104 |
| 7,069,541 B2 * | 6/2006 | Dougherty et al. ........... | 717/122 |
| 7,188,336 B2 * | 3/2007 | Humphries .................... | 717/123 |
| 7,584,451 B2 * | 9/2009 | Iborra et al. ................... | 717/101 |
| 7,644,390 B2 * | 1/2010 | Khodabandehloo et al. . | 717/105 |
| 7,698,160 B2 | 4/2010 | Beaven et al. | |
| 7,895,563 B2 * | 2/2011 | Carlson et al. ................ | 717/102 |
| 8,006,222 B2 * | 8/2011 | Ruhe ............................ | 717/101 |
| 8,095,413 B1 | 1/2012 | Beaven | |
| 8,195,497 B2 | 6/2012 | Montgomery | |
| 8,275,836 B2 | 9/2012 | Beaven et al. | |
| 8,352,914 B2 * | 1/2013 | Sarkar et al. .................. | 717/121 |
| 8,381,170 B2 * | 2/2013 | Avritzer et al. ............... | 717/101 |
| 8,418,123 B2 * | 4/2013 | Kamiyama et al. ........... | 717/101 |
| 8,418,136 B2 * | 4/2013 | Gioberti et al. ............... | 717/120 |
| 8,438,532 B2 * | 5/2013 | Fox et al. ....................... | 717/101 |
| 8,539,532 B2 * | 9/2013 | Bauchot et al. ................ | 725/62 |
| 8,572,552 B2 * | 10/2013 | Kennaley ....................... | 717/104 |
| 8,607,190 B2 * | 12/2013 | Coldicott et al. ............. | 717/105 |
| 8,621,417 B2 * | 12/2013 | Kaulgud et al. ............... | 717/102 |
| 8,627,269 B2 * | 1/2014 | Malasky et al. ............... | 717/100 |
| 2004/0186762 A1 | 9/2004 | Beaven et al. | |
| 2007/0168918 A1 | 7/2007 | Metherall et al. | |
| 2008/0052358 A1 | 2/2008 | Beaven et al. | |
| 2011/0289474 A1 | 11/2011 | Sukhenko et al. | |
| 2012/0311044 A1 | 12/2012 | Beaven et al. | |
| 2012/0311451 A1 | 12/2012 | Beaven | |

OTHER PUBLICATIONS

Haines et al, "How a Service-Oriented Architecture May Change the Software Development Process", communications of the ACM, vol. 53, No. 8, pp. 135-140, 2010.*
Jeet et al, "A Model for Estimating Efforts required to make Changes in a Software Development Project", ACM, pp. 175-178, 2011.*
Landre et al, "Agile Enterprise Software Development Using Domain-Driven Design and Test First", ACM, pp. 983-993, 2007.*
Agrawal et al, "An End-to-End Domain-Driven Software Development Framework", ACM, pp. 8-15, 2003.*
Agile Helpline "Distributed Agile Teams: Stick your sticky notes on the cloud," http://www.agilehelpline.com/2011/05/sticky-notes-vs-agile-tools.html, 9 pages (last accessed on Jan. 19, 2013).

* cited by examiner

*Primary Examiner* — Anil Khatri
(74) *Attorney, Agent, or Firm* — Proskauer Rose LLP

(57) ABSTRACT

A system and method configured to provide access to and management of information from a plurality of third party software development systems from a single application, where each software development system has a unique data module. Data is retrieved from third party software development tools and cached in a temporary repository to be merged and linked. Changes made are temporary until saved, at which point the changes are saved back to the software development system that originated the data. The system provides interactive manipulation and a consolidated view of merged data for more efficient management, collaboration and real-time editing without going into each individual software development system. This set up embraces and enhances the agile software development interaction while overcoming the software administration, management and maintenance issues of having a plurality of software development tools across a variety of project teams and locations, including geographically disperse locations.

21 Claims, 9 Drawing Sheets

FIG. 1 System Overview 100

FIG. 2 Flow Chart of System 200

FIG. 3  Domain Table Mapping – Creating Links  300

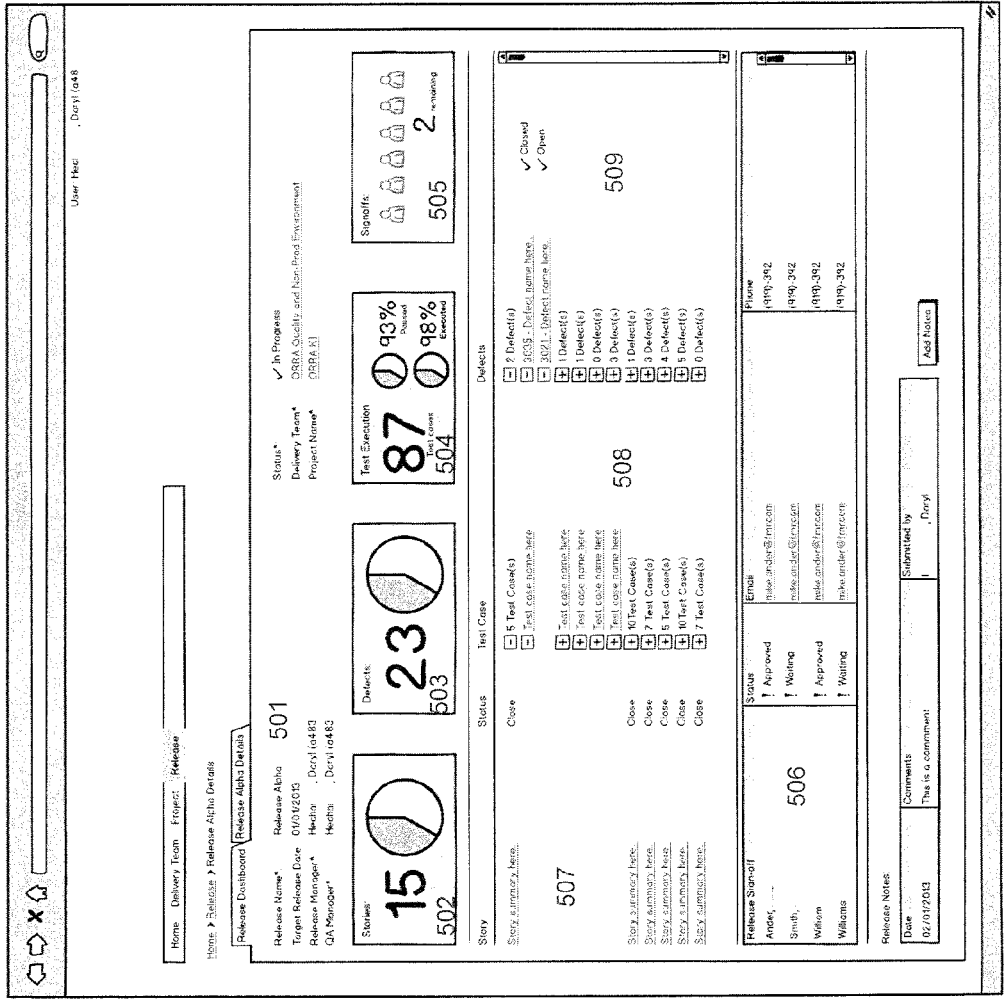
FIG. 5 -

FIG. 6 - Scorecard View

Scorecard 600

Scorecard Options 601

- Scorecard: FMT Scorecard
- View: By KPI
- Period: Month Jan / Year 2013
- Monthly
- Group: FMT-FMT
- KPI: All
- Submit

Legend 602
- On Target
- Minor Variance
- Significant Variance 604

| Goal | KPI | Measure | Target | Status | Actual | Comments |
|---|---|---|---|---|---|---|
| Alignment | Alignment with PWHS/Corp Svcs/ FFCMS | Green | 80% | | 80% | |
| | Strategic Initiative Effectiveness | Kl Green | 80% | | 93% | |
| | Apps Retired | Retirement | 125 | | | |
| | | Retirement | 125 | | 88 | |
| | Apps off l: | | 80% | | 50% | |
| | | | 80% | | % | |
| Long Term Profitability | Efficiency Metric | Pro Serv Rate | 10% | | 4% | comment 3 |
| | Headcount | Full Year Average | 1040 | | 1030 | comment 4 |
| | | Year Ending HC | 1035 | | 1045 | |
| | Service Levels | 3 per Qtr | 55 | | 53 | |
| | | 1/2 per Qtr | 6 | | 6 | |
| | Total Expense | | 396M$ | | 450M$ | |
| | | Score | 85% | | % | |
| | Employee Engagement | Score | 85% | | 80% | |
| | People Development | Pulse Poll | 85% | | % | |
| | | Pulse Poll | 85% | | 80% | |
| Talent | People Management | Goals | 100% | | % | |
| | | Goals | 100% | | 100% | |
| | Staffing Model | Offshore | 35% | | 28% | comment 2 |
| | | Variable | 35% | | 33% | sample comment 1 |
| | Top Talent Retention | Retention | 95% | | % | |
| | | Retention | 95% | | % | |

603

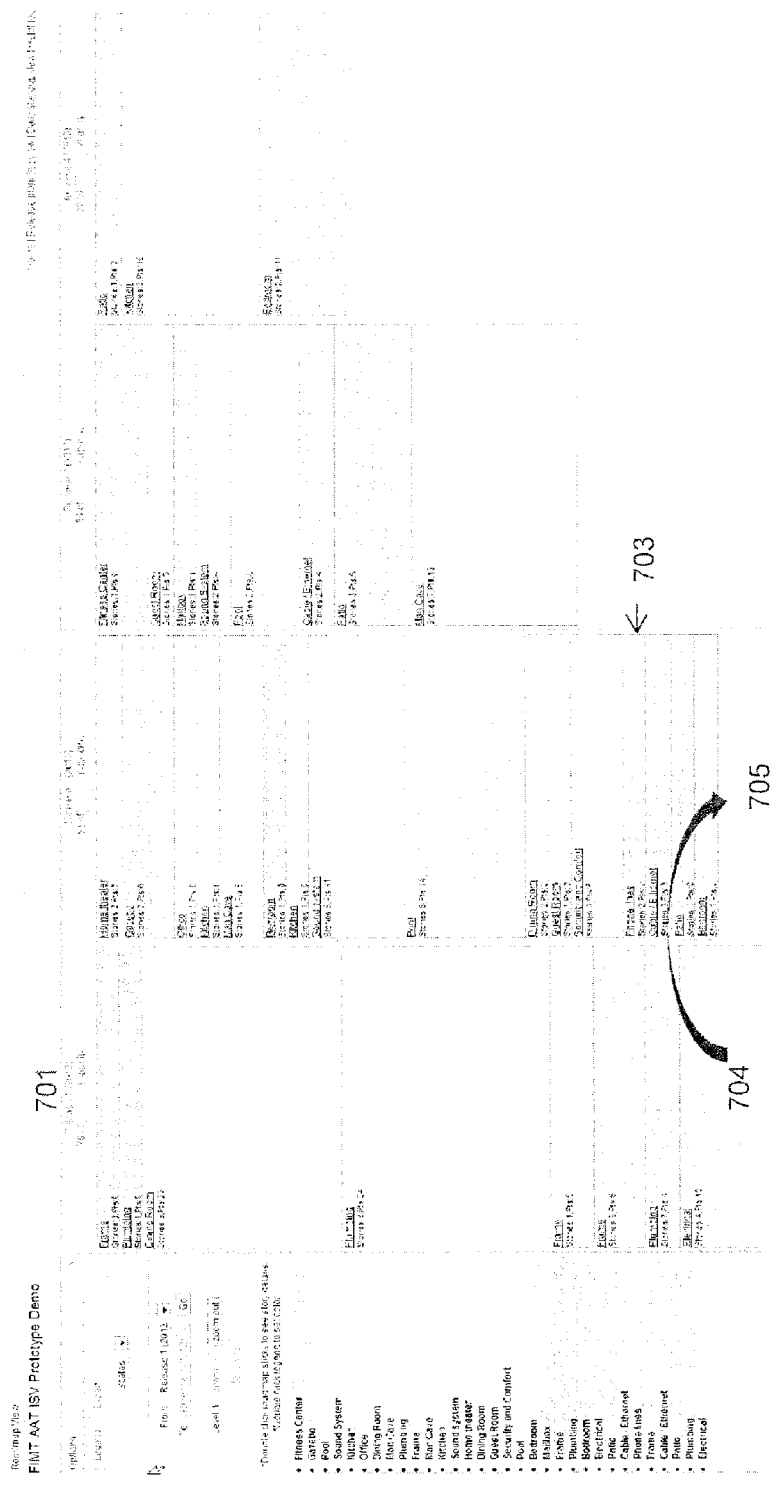
FIG. 7 - Roadmap View

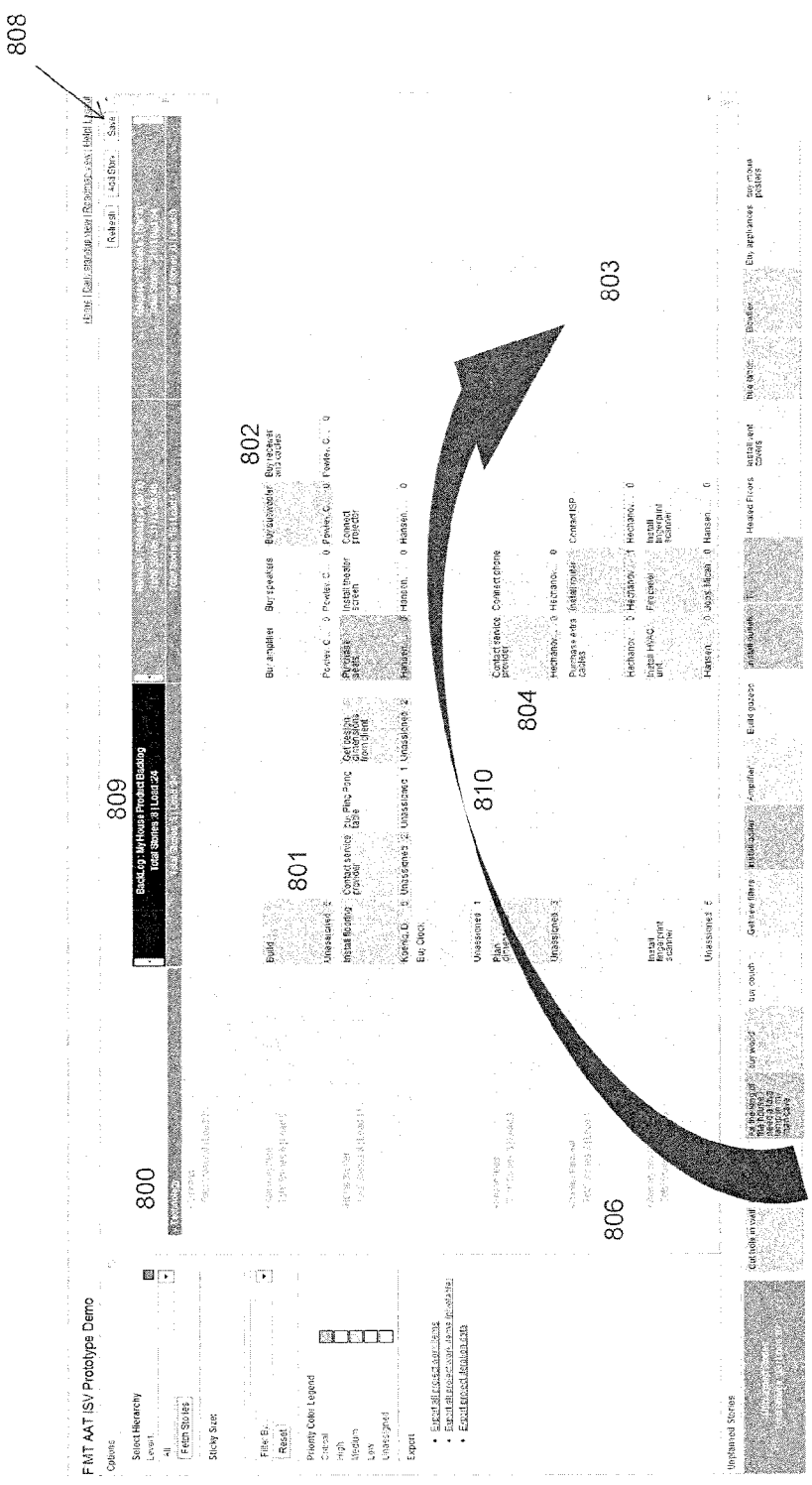
FIG. 8 - Sticky Notes on Release Planning View

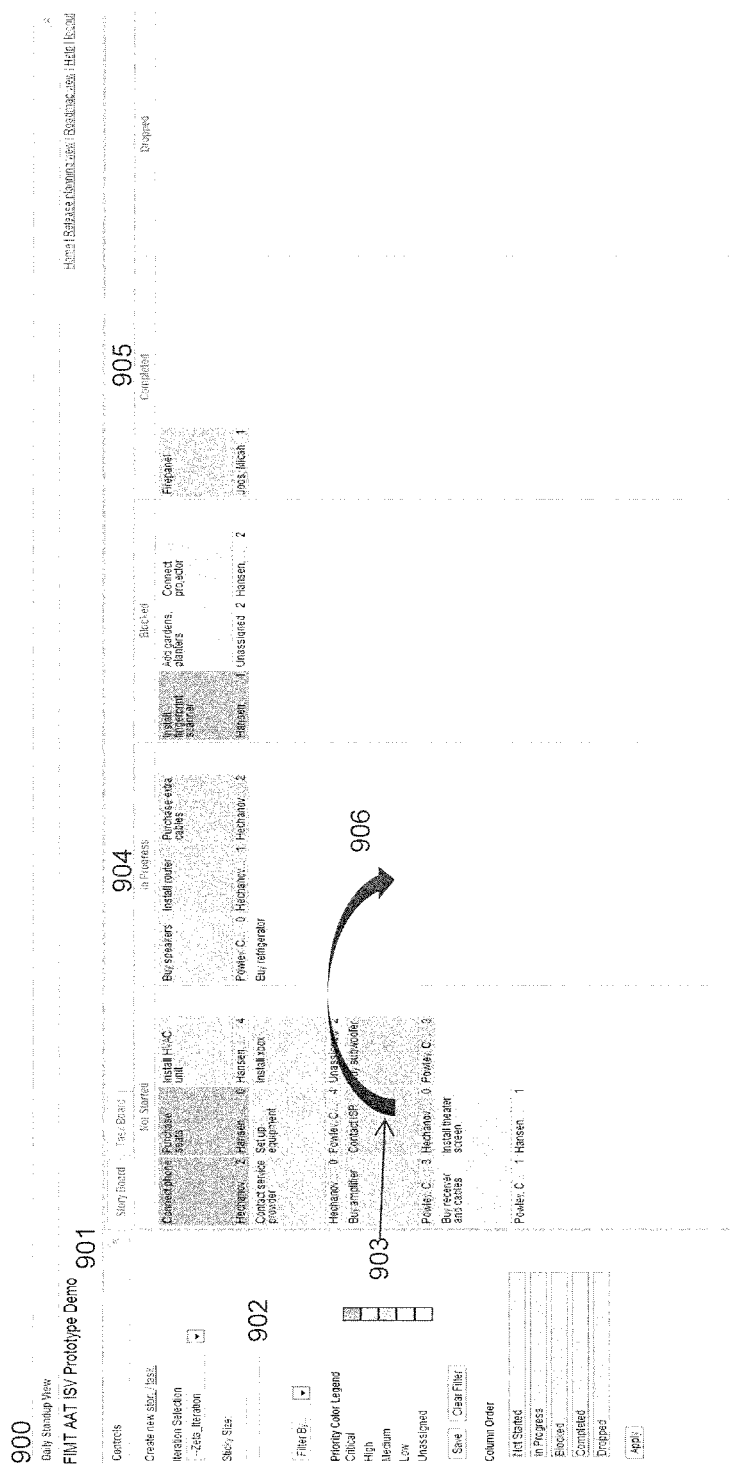
FIG. 9    Sticky Notes on Daily Standup View

SYSTEM AND METHOD FOR PROVIDING ACCESS TO DATA IN A PLURALITY OF SOFTWARE DEVELOPMENT SYSTEMS

FIELD OF INVENTION

The invention relates generally to software development management and planning systems and more particularly to accessing and managing information from a plurality of third party software development systems from a single application, where each software development system has a unique data module. The invention further relates to creating an agile software development management system for a plurality of third party software development systems capable of agile processes, such as a daily standup, for a plurality of teams at the same or different location with the same or different software development management systems.

BACKGROUND

The structure and progressive method of developing a software product is known as a software development process or a software development life-cycle. Several models exist for such processes, each with its own methodologies or approaches to tasks, activities and personal that exist and take place during the process of development. For example, a software development team may choose to utilize a waterfall model, spiral modal, iterative or incremental model, agile methods or rapid development. Many models exist because project management can be difficult, and without effective project management, developing software can become uncontrollable, get off track and end up being delivered late, over budget, and/or with a lot of bugs or issues to fix. Software developers therefore always need a way to effectively manage the process of development to meet user expectations in terms of functionality, cost, and delivery schedules. Whenever software fails to meet these expectations, it is often a cause of ineffective process management rather than ineffective software developers or programmers.

One of the more recent trends in these methods of software development is the Agile software development method. This method is a variant of an iterative and incremental development type strategy where requirements and solutions are created through collaboration of the software development team via self-organizing and cross-functional teams. The Agile software development method is aptly named for its promotion of agile adaptive planning and flexible response to changes in requirements. The Agile method breaks tasks into small incremental steps made with minimal planning. Iterations of the software are produced in short time frames as well, typically lasting only one to four weeks. Each iteration generally involves minimal planning, requirements, design, programming, and testing. At the end of each iteration, a working product is demonstrated, which allows for short incremental steps on a working product. These small workable steps minimize the risk involved in each change or step and allows the project to easily adapt to new requirements or issues that pop up during development, even when such changes are made late in the development process. Although each iteration does not particularly add much functionality to warrant a new release, the method does provide a workable release with minimal issues at the end of each iteration.

The Agile method also promotes face-to-face interaction amongst the software development team and often management as well. Such interaction generally takes place amongst teams at the same location, often even in the same room or bullpen, to further promote the ability to collaborate, change as needed and adapt to those changes or issues that arise. For example, a popular agile process involves a Daily Standup in which each member of the team goes over their current or upcoming tasks and updates the team on the progress. This standup and other interaction often includes the use of sticky notes, where each task is listed on a sticky note and moved along the board as the task goes through the process to completion. Similarly, white boards or other bullet boards can be used to track tasks. As great as these physical representations are for collaborative efforts, these physical representations are ineffective for management often requiring duplicative effort for management to audit the board, create status reports, to track history and of course such physical representations are difficult to send to remote team members or remote team locations. Daily contact, communication, and management of such agile processes are strained by the inability to effectively coordinate larger or geographically distant teams that cannot easily incorporate the collaborative spirit of the agile process and methods. Thus such physical collaboration and interaction is complicated by larger or distant teams that cannot all be in the same location.

Throughout the years, project management tools that have been created to more effectively organize and document the software development process. Specifically, in more recent years project management tools have been designed to aid developers using the agile method (as well as other methods) and to help larger and geographically distant teams interact over a network or the internet. For the sake of collaboration, consistency and effectiveness, such a management tool would actually require the consolidating and facilitating of project management, product management, customer management, programmers, testers, etc., into a single environment or management tool. The reality is, however, that currently several management tools are utilized by the manager, programmer or tester to accommodate their individual needs and no common management tool is used to accommodate everyone's needs throughout the development process. Further still, different teams at different locations may choose to utilize different management tools that they are more familiar with or better suit their needs, which further complicate the overall management process of software development. For example, numerous tools are available, some including RTC, HP Quality Center (QC), Service Manager, Clear Case® (CC), Sonar®, PPMC®, Jira®, Fitness, Cucumber, GitHub®, Jenkins, Evolven®, Clarity®, Visio® or even Excel® or Access® to track the development process. Many of these tools lack an overall management capability and are only designed for a particular part or person in the development process. For example, RTC tracks projects, work items, stories, tasks, releases, iterations, and signoffs, whereas QC tracks test plans, test cases, test executions, defects, and root causes of defects. Likewise, Clear Case® may track only the source code or Sonar only tracks the build and the code quality metrics. Service Manager instead tracks release tickets, change tickets, incidents reports, and overall problems. Other tools like CMDB track application registries, product lines, products, databases and servers, and Project Team tracks project team attributes, personnel, business deliverables, and product alignment. On more of the management side, PPMC/Financials tracks project resources and project financials. Thus each of these tools does not have an overall management capability and are designed for specific parts of the development process.

As a more detailed example, many delivery teams use RTC for planning and execution of software design and development. Unfortunately, RTC lacks useful planning and tracking capabilities forcing teams to employ different tools and techniques outside of RTC adding unnecessary effort and complexity. These, extra tools unfortunately leads to duplicative work, difficult oversight, inefficiency and can create a separation of information that should be viewed together or collaboratively amongst the various parts of the team. Further still, these independent management tools are not designed to interact and are composed of unique data modules that are not compatible with one another making it difficult to take the data from one tool to another. Again, this incompatibility leads to duplicative work, difficult oversight, inefficiency and can create a separation of information.

Although some tools offer suites of management tools that interact, it can be difficult to get teams and/or data to migrate to a different tool or suite of tools, because people are creatures of habit and often managers, programmers, testers, etc. in the software development process often get familiar or comfortable with certain tools making it hard and unlikely for personnel to adjust. Often this leaves such new tools unused and thus ineffective. Additionally, these suits are incapable of interacting with other third party tools. The inability to effectively manage the plurality of software development tools utilized across the development process, across various development teams, across various development tools and across geographically disperse locations not only interferes with the collaborative style of the agile process but also breaks down the necessary oversight essential to effective project management via any software development methodology.

SUMMARY OF THE INVENTION

Described herein are various technologies and methods for providing a project management tool that enables teams to more effectively plan, collaborate and communicate as well as provides a more intuitive way to manage agile projects. The technologies and methods described allow for tool and geographically disperse development teams to visualize and interact using a common electronic backlog without delay of double entry or transcribing from a plurality of physical or electrical management tools. These technologies and methods described provide a consolidated view of the project data for understanding the health of a project, improving decision making and allowing teams to manipulate the data off a common data set without the need to do independent analysis or duplicative work.

The technologies and methods consistent with this invention overcome the software administration, management and maintenance issues of having a plurality of software development tools in the prior art by providing, in various embodiments, a computer implemented method for a software development planning and management system operative across a plurality of software development systems including quality control systems, project management systems and service manger systems, where each software development system has a unique data model. The system comprises a plurality of application programming interfaces, wherein an application programming interface is associated with at least one of the plurality of software development systems. Each application programming interface is able to communicate with the at least one of the software development systems via the unique data model. For example, the application programming interface is capable of retrieving data from the at least one associated software development system. Additionally, the application programming interface is capable of saving data to the at least one associated software development system. In one embodiment, the invention provides that at least one repository contains the retrieved data from each of the associated software development systems. The repository is a temporary location for caching the retrieved data. In another aspect, the invention further provides that at least one domain table maps the retrieved data from an associated software development system to the retrieved data from each of the other associated software development systems to create the set of integrated data. With a set of integrated data, the data management module can cache changes to the set of integrated data in the at least one repository, and only save changes upon user selection or indication to save the changes. When the user selects to save the changes, the data management module records changes to the set of integrated data via the plurality of application programming interfaces to each of the associated software development systems from which the data was retrieved.

In further embodiment of the computer implemented method for administering a software development planning and management system, the system includes a plurality of software development systems, where each software development system has a distinct data model, and the method comprises providing a plurality of application programming interfaces. Each application programming interface is associated with at least one software development system and is capable of retrieving data from the at least one software development system. Additionally, the application programming interface is capable of saving data to the at least one software development system. The system establishes, via a computing device, a session with a user. After the session is established, each application programming interface retrieves a set of data retrieved from each of the associated software development systems. The system then caches, via a data repository, the set of data retrieved from each of the associated software development systems. The data repository is again a temporary memory location. The data management module then forms a set of integrated data by creating a plurality of at least one domain tables that map the set of data retrieved from each of the associated software development systems to the set of data retrieved from each of the other associated software development systems. Then the data management module caches changes to the set of integrated data in the data repository and saves, upon user selection, via the plurality of application programming interfaces, changes to the set of integrated data through the associated application programming interface to each of the associated software development systems from which the data was originally retrieved.

In another embodiment, the computer implemented method further comprises deleting changes to the set of integrated data cached in the data repository when the session ends. In another aspect, the computer implemented method further comprises caching the set of data retrieved from each of the associated software development systems via a plurality of data repositories. In a further embodiment, a plurality of remote computing devices establishes a plurality of sessions by a plurality of users, wherein the plurality of users change the set of integrated data in real-time. In this embodiment, the method further involves caching, via the data management module, changes to the set of integrated data in the data repository, and saving, upon user selection, via the plurality of application programming interfaces, changes to the set of integrated data through the associated application programming interface to each of the associated software development systems from which the data was originally retrieved.

In a further embodiment, the data management module refreshes a session from the plurality of sessions upon a user selection to refresh. In this embodiment, the data management module discards the set of data retrieved from each of the associated software development systems as well as discards the changes made to that set of data that was not previously saved. The system then retrieves, via the plurality of application programming interfaces, a new set of data from each of the associated software development systems, the new set of data contains changes from the plurality of users. The data management module then caches the new set of data from each of the associated software development systems in the data repository. Then the data management module forms a new set of integrated data by creating a plurality of domain tables that map the new set of data retrieved from each of the associated software development system to the new set of data retrieved from each of the other associated software development systems. Further, the data management module caches changes to the new set of integrated data in the data repository, and then the plurality of application programming interfaces save the changes to the new set of integrated data through the associated application programming interface to each of the associated software development systems from which the data was originally retrieved.

In another aspect, the computer implemented method further comprises throwing, via the data management module, an error when the set of data retrieved from each of the associated software development systems does not map to the set of data retrieved from each of the other associated software development systems. In yet another aspect, the data management module automatically sends a report to a manager of the associated software development system when the error is thrown. In a further embodiment, the data management module can query based on user input the set of integrated data, and provide a query report containing information queried from the set of integrated data.

In another aspect, the data management module provides a display view of the set of integrated data wherein a user associates a sub-set of the set of integrated data to at least one task to be completed. In a further embodiment, the computer implemented method further involves creating, via the data management module, at least one task to be completed, wherein the user associates the at least one task to software development information. The software development information can include at least one of a phase in a timeline, sub-task, status, priority level, task size, personnel resource, team, software requirement, software quality testing task, software integration task, software release task, release date, software defect or any combination thereof. The data management module then updates the sub-set of the set of integrated data based on the associated software development information. The data management module caches changes to this sub-set of the set of integrated data in the data repository, or into a plurality of data repositories. Upon user selection to save, the plurality of application programming interfaces save any changes to the set of integrated data through the associated application programming interfaces to each of the associated software development systems from which the data was originally retrieved.

In another embodiment, the data management module displays on a graphical user interface a view of the plurality of tasks to be completed in the form of a plurality of sticky notes on a sticky board. A sticky note can contain at least one task to be completed and the software development information associated with the sticky note or task. The sticky board is a grid of cells, each cell representing a relationship between the sticky note placed in the cell and at least one of the phase in the timeline, sub-task, status, priority level or any combination thereof, or any other software development process information. It is noted, that the graphical user interface could display the sticky notes on a sticky board comprised of another set up besides a grid cell that would have the same effect of placing the sticky note in a location that represented a relationship between the sticky note and some development process information. In another aspect, the display via the data management module, can depict the sticky notes varying in size. The size of the sticky note can be made proportional to an estimated amount of time needed to complete the associated at least one task. The size of the sticky note could also depict other software development information, for example, the number of people working on the task or the estimated amount of iterations to completion. In yet another aspect, the data management module can display the sticky notes varying in color. The color of the sticky note can represent a relationship between the sticky note and at least one of the phase in the timeline, sub-task, status, priority level, personnel resource, team, software requirement, software quality testing task, software integration task, software release task, release date, software defect or any combination thereof, or any other software development information. In another aspect, The computer implemented method via the data management module can associate text relating to at least one task on the created sticky note. For example, the user might associate a group name, task name, software requirement, or any other development information to the created sticky note. Further, the data management module can further associate text to the sticky note relating to at least one of the phase in the timeline, sub-task, status, priority level, personnel resource, team, software quality testing task, software integration task, software release task, release date, software defect or any combination thereof. In another aspect, the computer implemented method further comprising displaying, via the data management module, the sticky note at a location within a cell, where the location of the sticky note within the cell represents a relationship between the sticky note placed in the cell and at least one of the phase in the timeline, sub-task, status, priority level, personnel resource, team, software requirement, software quality testing task, software integration task, software release task, release date, software defect or any combination thereof.

In another embodiment, the data management module provides an interactive display view of the plurality of sticky notes, wherein the user can drag at least one of the sticky notes from a first cell on the grid to a second cell on the grid. When the user drags the sticky note to a new location on the grid, or other sticky board set up, the data management module updates the software development information of the dragged sticky note based on the change in position of the sticky note from the first cell to the second cell. This change is then reflected in the merged data. The data management module caches these changes to the sub-set of the set of integrated data in the data repository. This data is in this temporary location until upon user selection to save. When the user selects to save the changes, the plurality of application programming interfaces saves the changes to the set of integrated data through the associated application programming interface to each of the associated software development systems from which the data was originally retrieved. In a further aspect, the data management module can also provide an interactive display view of the plurality of sticky notes wherein the user changes the size of at least one of the sticky notes. The change in size relects a change to the cached merged data updating the information for that sticky note. For example, a change in size denotes a change to the amount of time to complete the task or as another example, the amount of people working on the task. Thus, upon the user's change in size, the data management module updates the software development information of the at least one sticky note based on the change in size, wherein the data management module caches changes to the sub-set of the set of integrated data in the data repository. This change is temporary until the user selects to save the changes. Upon user selection to save, the plurality of application programming interfaces saves the changes to the set of integrated data through the associated application programming interface to each of the associated software development systems from which the data was originally retrieved.

In another embodiment, the data management module can also provide an interactive display view of the plurality of sticky notes, wherein the user changes the color of at least one of the sticky notes. When the user selects to change the color of the sticky note, the data management module updates the software development information of the at least one sticky note based on the change in color, i.e., the data management module caches changes to the sub-set of the set of integrated data in the data repository. Again, this change is temporary until the user selects to save the changes. Upon user selection to save, the plurality of application programming interfaces save the changes to the set of integrated data through the associated application programming interface to each of the associated software development systems from which the data was originally retrieved. In a further embodiment, the data management module can further provide an interactive display view of the plurality of sticky notes, wherein the user changes the text of at least one of the sticky notes. The data management module updates the software development information of the at least one sticky note based on the change in text by the user, i.e., the data management module caches changes to the sub-set of the set of integrated data in the data repository. This change is temporary, however, upon the user's selection to save the changes, the plurality of application programming interfaces saves the changes to the set of integrated data through the associated application programming interface to each of the associated software development systems from which the data was originally retrieved. In another aspect, the data management module can provide an interactive display view of the plurality of sticky notes, wherein the user can filter the sticky notes on the sticky board by at least one of the phase in a timeline, sub-task, status, priority level, task size, personnel resource, team, software requirement, software quality testing task, software integration task, software release task, release date, software defect or any combination thereof, or any other provided software development information.

BRIEF DESCRIPTION OF THE DRAWINGS

Embodiments are described in detail below with reference to the drawing figures provided herein, wherein:

FIG. 5 is an exemplary graphical user interface or dashboard screen for data entry and project oversight using the merged data;

FIG. 6 is an exemplary graphical user interface or dashboard screen for data project oversight and project metrics using the merged data;

FIG. 7 is an exemplary graphical user interface or dashboard screen for data project oversight or a road map view using the merged data;

FIG. 8 is an exemplary graphical user interface or dashboard screen for data project oversight displaying the use of electronic sticky notes for release planning; and FIG. 9 is an exemplary graphical user interface or dashboard screen for data project oversight displaying the use of electronic sticky notes at the story board planning level.

These drawing figures do not limit the claims to the specific embodiments disclosed and described herein.

DETAILED DESCRIPTION

Figure 1:
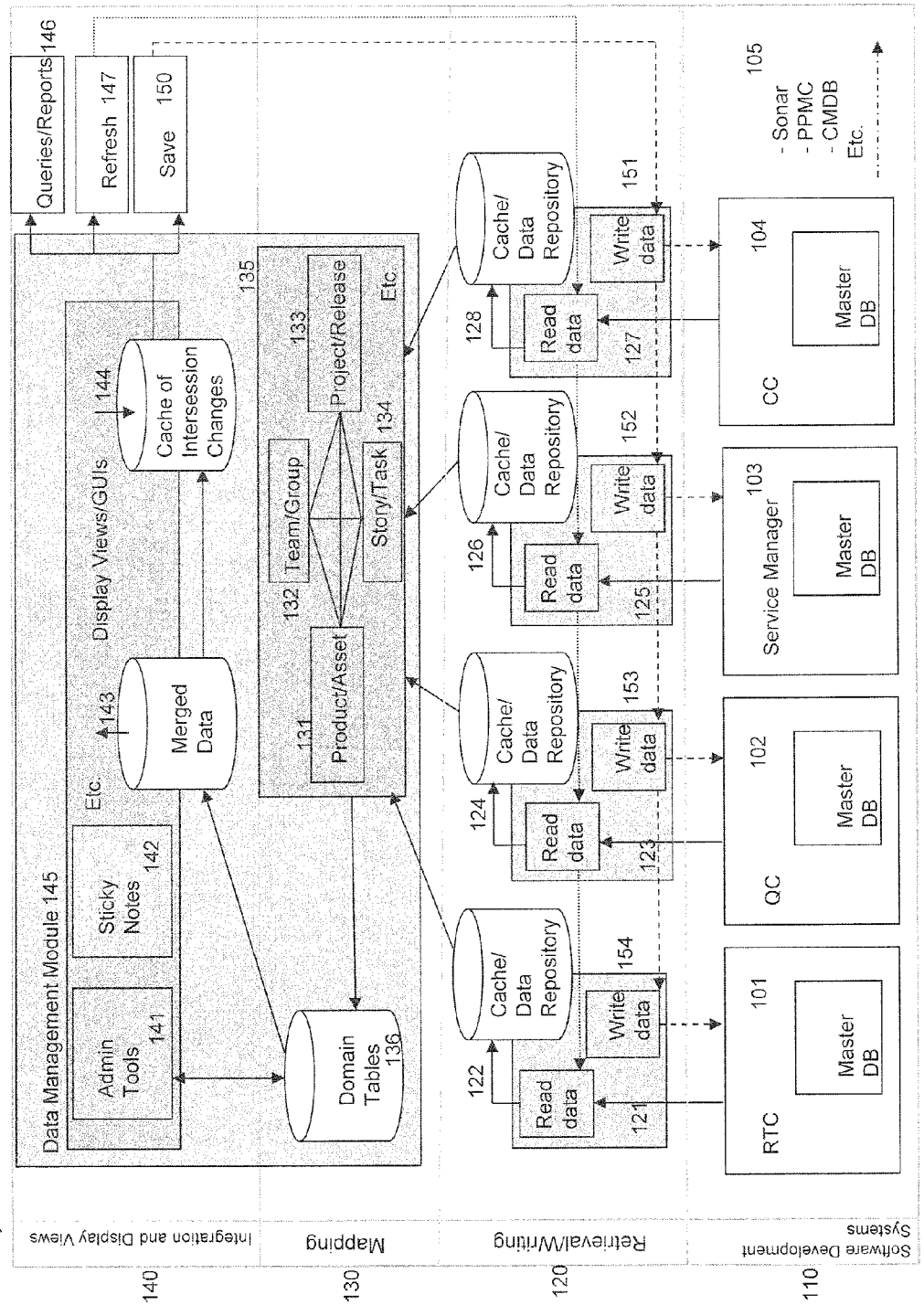
FIG. 1 is overview diagram of the system provided herein.

FIG. 1 is an overview of one embodiment of the configuration of the software development planning and management system 100. In the illustrated embodiment, FIG. 1 is divided into the several steps of the system. In the first step 110, information regarding the different phases of the software development process is input by users of these tools. Such information, for example, can be regarding the software being developed, stories that need to be completed, tasks to be completed, test cases for development, development teams, testing teams, or any other information related to the management and development of software. This information via user input is formulated and stored in the various software development tools 110, including but not limited to RTC 101, Quality Center (QC) 102, Service Manager (SM) 103, Clear Case® (CC) 104 and others 105, which are enterprise project management and backlog tracking tools generally used to track various data throughout the development process. The present system 100 is configured to be vendor agnostic, so any project management or backlog tracking tool could be used within the system. Therefore, users can keep using such tools and run these tools independently of the present system 100 such that the system only accesses these tools for stored data or to store data 120. Therefore, as shown in this embodiment, RTC, QC, SM and CC are merely provided as examples of such software development tools working with the present invention. For example, other software development systems 105 such as Sonar, PMC, CMDB, Jira®, Fitness, Cucumber, GitHub®, Jenkins, Evolven®, and Clarity® are possible tools that could work with the present invention. Indeed, any other software development systems and any number of systems not herein listed or yet known could be used with the present system 100 as depicted in FIG. 1. Additionally, these software development systems 110 behave normally within the present system 100 and are not affected by the present system's interaction because they operate independently of the present system 100. Only data from the master databases of the software development systems 110 is read from or written back to these software development systems' master databases by the present system 100.

The second step 120 is the retrieval of this information from the master databases of the software development systems 110. Data utilized in these software development systems is generally stored in a master database within the individual development tool, as depicted in FIG. 1. Typically these individual development systems have their own distinct or unique data model such that data persisted to one development system is not compatible with data persisted to another development system simply because such systems are not built to communicate with one another. Although some companies develop suites of software for tracking various steps in the software development process, such as IBM's Rational suite, which is a lifecycle management suite of tools, these suites are typically not compatible with software programs from other companies like QC or CC. In contrast, however, the present system is able to facilitate the use of data from these individual systems, or even from the suite of tools, all within one system which cuts back on the users' needs to coordinate efforts amongst the different systems. This facilitation is achieved by collecting information from the individual systems, or tools, in a manner that allows manipulation of such data by the user in one program. This facilitation is illustrated in FIG. 1 where data from each of these systems is retrieved 120, i.e., read from the master database of the individual systems 121, 123, 125, 127, and transferred to a temporary cache or data repository 122, 124, 126, 128. Data from the master database of an individual system can be read by an application program interface (API) 121, 123, 125, 127 that is associated with the particular software development system. As shown in FIG. 1, an API 121, reads data from the master database of the RTC tool. An API can be associated with a plurality of software development systems and the API is capable of retrieving data from and saving data to the plurality of software development systems, as long as the API is capable of interacting with each of the software development systems' unique data models. Additionally, an API can be associated with a plurality of software development systems with the same data model, such as in the case of a suite of software development tools. In another embodiment, data from the master database of a software development tool can also be read in bulk by an extract transformation load, or ETL Pull, which would grab all the data from each master database. In this embodiment, the ETL reads a large data set, such as an overnight batch feed, which may be started in advance by the user to obtain a larger quantity of data from each of the software development systems. In another embodiment, an API alternatively and typically reads a smaller data set from the master database for a more interactive approach that allows quicker reading and writing of smaller data sets. The present system 100 therefore can be configured to allow the user to select whether an entire system pull is needed for a complete overview of all the data, via an ETL 121, or whether the user is looking for a more interactive approach consisting of using only a subset of data from all the systems, via an API 121. Alternatively, the present system 100 can be configured such that the system automatically determines whether an ETL or API is required to pull the data based on the users request or actions. For example, if the user selects to view data via a Release Dashboard, which is described later in greater detail, such a request requires a larger set of data. Therefore, the present system can be configured to automatically switch to an ETL to retrieve the larger data sets. Alternatively, the present system can be configured to alert the user that their request requires a larger set of data requiring an ETL Pull and thereby may require a longer period of time to retrieve. If, however, the user selects to view a smaller set of data, such as via a Daily Standup View, which is described in greater detail below, the present system can be configured to automatically switch to an API to retrieve this smaller set of data. Therefore, the present system can be configured to automatically switch to utilize an API to retrieve the smaller data set. Retrieval of smaller sets of data by an API is appropriate for interactive and less data intensive dashboards.

Once data from the master databases of the software development systems is read by the API or ETL 120, the retrieved data is stored by the system 100 in a temporary cache or data repository 120. Typically the cache is an intraday cache, however, it is understood that other temporary caching works within the illustrated embodiment as well. Data retrieved from each of the master databases of the individual software development tools 110 can be cached in a plurality of temporary data repositories 122, 124, 126, 128. Alternatively, in another embodiment, the data from each of the master databases of the individual software development tools 110 can be cached in a single temporary data repository (not shown in FIG. 1). Data transferred 120 from a software development system 110 to the cache or data repositories 122 by the API or ETL 121 is a one-way transfer of data. Although APIs are generally capable of two-way communication, i.e., reading and writing data from associated software development systems, the API 121 in the present system 100 is only utilized at this step in the process to retrieve or read the data 120 from a software development tool 110 to be loaded into a temporary data deposit 122. Data retrieved is not written back to the originating software development tool 110 until the user selects to save the data 150 or changes to the data. Therefore, the data transferred to the temporary cache or data repository 121 is not directly written back to the originating software development tool 100. Thus, the data transferred to the temporary cache or data repository 121 is considered temporary and is not permanently saved to any database. Therefore, the present system can be configured such that data cached in this temporary repository can be deleted, or flushed out, on a periodic basis. Alternatively, the present system 100 can be configured such that the data can be deleted from the temporary repository in response to a user command to do so. In yet another embodiment, the present system 100 can be configured such that the data is deleted from the temporary repository upon the exit of the user from the system, or upon the exit of the user from particular dashboards within the system without the user selecting to save changes made to the data on the particular dashboard exited. Further, in yet another embodiment, the present system 100 can be configured such that the data is deleted from the temporary repository upon user request to refresh the data. Importantly, this transfer of data to a temporary cache or data repository 122 allows the pulled data to be manipulated by the user without compromising the integrity of the data stored in the master databases of the individual software development tools 110. The system 100 allows the user to manipulate the data from multiple software development tools without fear of overwriting the master set of data stored in the master databases of the individual software development tools 110, but allows the user to save 150 data back to the master set of data stored in the master databases of the individual software development tools 110 when the user is satisfied with the changes made to the data. This set up embraces the agile software development interaction allowing numerous manipulations to the merged set of data from the various software development systems that can occur in interactive development process, such as a Daily Standup view, thereby allowing the agile process to be conducted without hindrance and efficiently by only saving the data back to the originated tools once completed.

After the data is retrieved from the master databases of the individual software development tools and cached in a temporary data repository, the software development planning and management system can access and load the data into the system's data management module for manipulation by a user, i.e., such that the user has access to data from each of the individual software development systems. Alternatively, in another embodiment, the user can have access to a smaller subset of the data from a plurality of the individual software development systems. For example, a subset of data from the data retrieved can be loaded for the user's view depending on the dashboard or view that the user is utilizing to view the retrieved data. As another example, a subset of data from the data retrieved can be loaded for the user's view depending on the user's qualifications as an owner, participant or manager of the system, as described in more detail below.

With access to data from each of or a plurality of the software development tools, the third step involves the user mapping the data 130 from one software development tool to another software development tool, or alternatively to a plurality of other software development tools, as illustrated in the embodiment of FIG. 1. For example, the present system 100 allows the user to map data from the RTC software development tool 101 to independent data from the QC software development system 102. Specifically, the RTC software development system may contain information regarding project tracking, work items, stories, tasks, releases, iterations, and SDLC signoffs, whereas data from the QC software development tool may contain information regarding test plans, test cases, test executions, defects, and root causes. The user can map or link data from one system to another, such as linking a test case to a particular release or to a specific iteration. As another more detailed example, the user can link a defect, which a user software tester input into the QC tracking system 102 during a test case, to iteration information input in RTC system 101 by a user project manager relating to the iteration that was being tested, and thereby link the defect to a whole other set of the information regarding the specific iteration, such as the release or story information.

In one embodiment, any user can create, edit or remove links from one software development tool data to another software development tool data. Alternatively, in another embodiment, only designated administrators can create, edit or remove links from one software development tool data to another software development tool data. An administrator can be described herein as an owner, manager, or other user of the system capable of creating, editing or removing links or other important information not desirable for editing by the full plurality of users. Note, this is different from the session owner or session manager described later herein. Further, FIG. 1 displays a further embodiment where the Data Management Module program 145 defines linkages of data sets from one software system to another 131, 132, 133, 134 as previously designated by users and existing in the Domain Tables 136 of the present system 100. FIG. 1 further displays the system also receiving information from an administrative user via an Administrative dashboard tool 141. As described above, an administrative user can create, edit or remove links between the data from one software development tool to another software development tool, which affects or updates the links defined in the Domain Tables 136. The links from the Domain Tables 136 creates a set of merged data that can be viewed or manipulated by the user or users of the system. Again, the merged data 143 gives the user a more complete view of the software development process across various phases, tools and people involved in the process.

This merged data can be viewed and manipulated 140 in many useful ways to improve the software development process which is the last step in this system overview. FIG. 1 provides two example views, the Administrative Tools view 141 and the Sticky Notes view 142 or dashboard. Among other administrative tasks, the Administrative Tool 141 view can be used to create, edit or remove links between one software development tool and another or a plurality of software development tools. The Sticky Notes view 142 as described in greater detail below is an electronic embodiment of the agile process currently done with physical sticky notes or notes. The present system's 100 merged data 143 allows for easier agile software development across multiple locations, multiple tools, and multiple teams. Another advantage of merged data is the ability to query data from all or a plurality of systems 146 and create reports from these queries.

The ability to query data from all or a plurality of systems makes it unnecessary to open each individual tool to query for the same information or related information and decreases duplicative efforts and time for the same administrative tasks.

All the merged data and changes to the merged data during a session, however, are also cached in a temporary data repository 144. Again the purpose of the temporary data repository 144 is to allow for user interaction and manipulation of the data while protecting the integrity of the original data in each of the software development systems, such that teams and users can work with the merged data in interactive settings and views, such as the Daily Standup View, and only save the changes when the user or group is in agreement as to the changes. Again, this set up embraces the agile software development interaction allowing numerous manipulations to the merged set of data from the various software development systems without writing back or overwriting the data in the individual software development systems, and only making permanent changes to the data in the originating tools when the user, group or team has agreed to such changes.

Once the user or team is in agreement to the changes to the merged data, the links between the data, or any other changes to the data, the user can select to save their intersession changes 150. When a user selects to save their intersession changes 144, these changes are persisted back to the originating software development system 151, 152, 153, 154, i.e., if the data pertains to the project tracking, work items, stories, tasks, releases, iterations, and SDLC signoffs or other data tracked in RTC 101, then the data is persisted back or written 154 to the master database for the RTC system 101. If, however, the data pertains to test plans, test cases, test executions, defects, and root causes or other data tracked in the QC 102, then the data is persisted back or written back 153 to the master database for the QC system 102. Likewise for any other software development systems 105 that had data read from their master database, the changes are written back 151, 152 to the software development system that originated the data. When a new session is created or a session is refreshed 147, the present system 100 then again reads 121, 123, 125, 127 the data from each of the software development systems 101, 102, 103, 104, 105, now containing the new updated data recently saved back to the software development systems, and creates a set of merged data with the most recent changes included.

In another embodiment, data can be refreshed into the temporary data repositories on a regular basis to avoid complications related to multiple user sessions and manipulations. In another embodiment, when a first session is established, the user becomes a session owner or session master having the capability of initiating and orchestrating the session. In this embodiment, subsequent users are logged into the same session in a "read only" mode. During this session, the session master has the ability to give control to a subsequent user who can then edit the merged data, for example, by moving, updating or integrating data via an interactive graphical user interface described in more detail below. These changes are then saved back to the software development systems that originated the data. In this embodiment, one user is a session master at any given time. Further in another embodiment, a subsequent user can request permission from the session master to have control during the session. Likewise, a subsequent user can request permission from the session master to share control during the session. Further, in another embodiment, the session master has the ability to take back control of a session from a subsequent user previously given control, i.e., override the subsequent user if necessary.

Or in a further embodiment, an owner, manager or administrator may have the ability to take control of a session from a first or subsequent user given control, i.e., override the control of a non-owner user.

Figure 2:
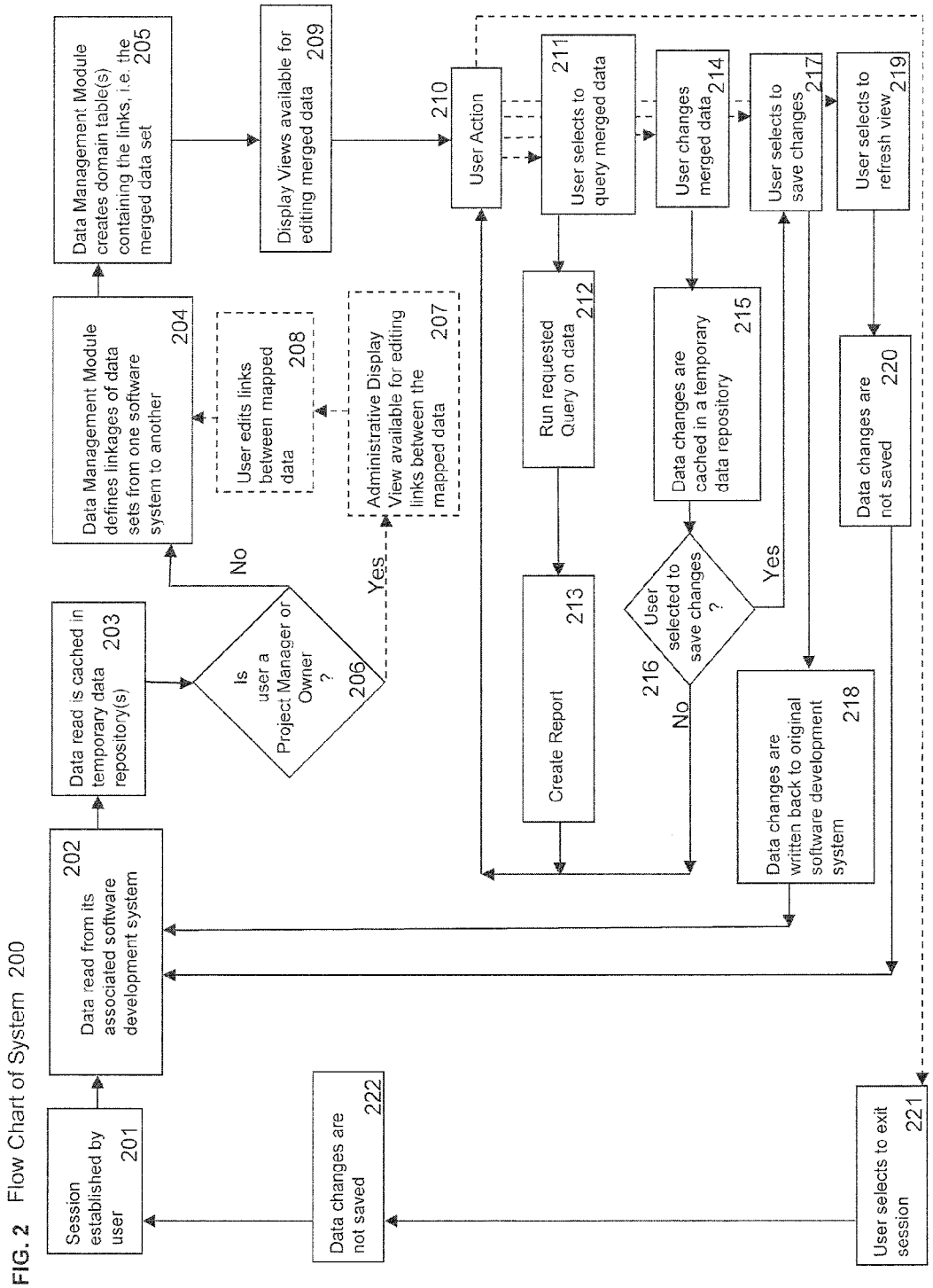
FIG. 2 is a flow chart diagram of the same system as provided in FIG. 1.

FIG. 2 shows a flow chart of the present system 100. A session is established by a user of the system 201. As discussed above and illustrated in FIG. 1, data is read from each of the software development systems 202 by an associated API or ETL. Again, an associated API or ETL is a program that is capable of reading from and writing to the software development system and capable of working with the software development system's unique data model. Use of an API or ETL depends on the amount of data requested by the user. For example, a regular user using the Stand Up display dashboard, or other sticky notes features, does not require extensive data sets including all of the data from all of the software development systems because these dashboards are intended to be fast, interactive, and specific to the project the user is working on at that time. However, if this user is an administrative user looking to setup links for all the software development systems or a manager trying to look at several projects or several release displays, there may be extensive data gathering required which may invoke the use of the ETL to read bulk amounts of data from the software development systems. The APIs and ETLs at this stage are only utilized to read the data from the software development systems and are not used at this stage to write or persist any data back to the software development systems.

When the data is read from individual software development systems, the data is cached in a temporary data repository or data repositories 203. The data repositories are only temporary and are cleared if the user exits the system, exits certain dashboard views of the data, or requests a refresh of the data. Once the data is cached in the temporary data repositories 203, the system can determine if the user is an administrator 206, and if the user is an administrator, the user is provided the capability to view, edit, or remove links between the plurality of software development tools 207. Additionally, the owner or manager may be given rights or access to other information involved with the system 100. Alternatively, the user could log in directly as an administrator when establishing a session 201 with the present system 100. If the user is a project manager, owner, or other administrator, the Administrative Tool view 141 is provided to the user for editing links between the mapped data 207. If the administrative user edits the links between the mapped data 208 then the Data Management Module redefines the linkages between the data sets from one software development system to another software development system 204 which are then used to create 205 the Domain Tables 136. In one embodiment, if the user is not a project manager, owner or other administrator 206, then the system 100 does not provide the user with the capability to edit the linkages between the plurality of software development systems, and instead the Data Management Module 145 defines the linkages between the data sets from one software development system to another or one software development system to a plurality of software development systems 204. The Data Management Module defines the linkages 205 by utilizing previously saved links in previously created and saved 150 Domain Tables 136 by the administrators.

In one embodiment, when the Data Management Module has created the Domain Tables from the defined links between the data sets from the plurality of software development systems 205, these links create a set of linked or merged data 205. This merged data set is the data viewed in the available dashboards 140 within the present system 100 and is available for editing and manipulation by the user 209. In one embodiment, the user has several actions available from the available dashboards presenting the merged data 210. The user can query the merged data 211 such that a query is run on the merged data set 212, retrieving data and information from the plurality of software development systems through one action, and creating a query report for the user 213. For example, the user may query information regarding a particular project name, task, or status, and the system can export an Excel or similar spreadsheet document as a raw work item with all the information regarding that particular project area, task or status 213. In another embodiment, the system may produce a pivotable Excel or similar spreadsheet file of the queried data from the merged data specifically designed for easy pivoting the data by the user 213.

In another embodiment, the user action can be the manipulation or change of the merged data 214. For example, a user can change the links between the data from one software development system to another. The user can change data regarding the projects, releases, stories, tests, or other software development tracking information. As another example, the user can be in the Sticky Notes dashboard or Daily Standup dashboard and move stickies from one release to another, one iteration to another or change the properties of a sticky note to reflect the work being done or the completion of the task that the sticky represents. Therefore there are many ways that a user may manipulate the merged data 214. In one embodiment, these changes, however, are only temporarily cached in a data repository 215 to allow for faster interaction and to protect the integrity of the underlying original data in the originating software development systems. In this manner, the master data is owned and managed by the existing owner of the data, i.e., the originating software development system. If the user does not select to save the changes made to the merged data 216, then the changes are not persisted back to the originating software development system. Rather these changes remain in the temporary data repository 215 until the user selects to save changes 217, selects to refresh the data 219 or exits the session 221. If the user selects to save changes made to the merged data set 217 in the system 100, the data changes are written back or persisted back to the original software development system 218, i.e., data originating from the RTC system 101 regarding project tracking, work items, stories, tasks, releases, iterations, and SDLC signoffs is persisted back to the RTC system 101, whereas data originating from the QC system 102 regarding test plans, test cases, test executions, defects, and root causes is persisted back to the QC system 102. The data persisted back to the original software development systems is now the most up to date information. Therefore, in one embodiment, after the data is saved, i.e., persisted back to the originating tools, the data is re-read from the plurality of software development tools 202, loaded into the temporary data repository 203, and merged 204-205 to be displayed and manipulated again by the in session user 209. In this manner, the system 100 ensures that the most current information or data is provided to the user from the plurality of software development systems. If the user selects to refresh the view 219, however, i.e., refresh the merged data, changes made to the merged data during the session are not saved to the originating system 220. Rather, a new set of data is read from the plurality of software development systems 202 and a new set of merged data is provided to the user for viewing and manipulation 203-209 Likewise, if the user selects to exit the session 221, any changes made without selecting to save changes are not saved to the originating system 222, and a new set of data is again read from the plurality of software development systems 202 when the user creates a new session 201.

Figure 3:
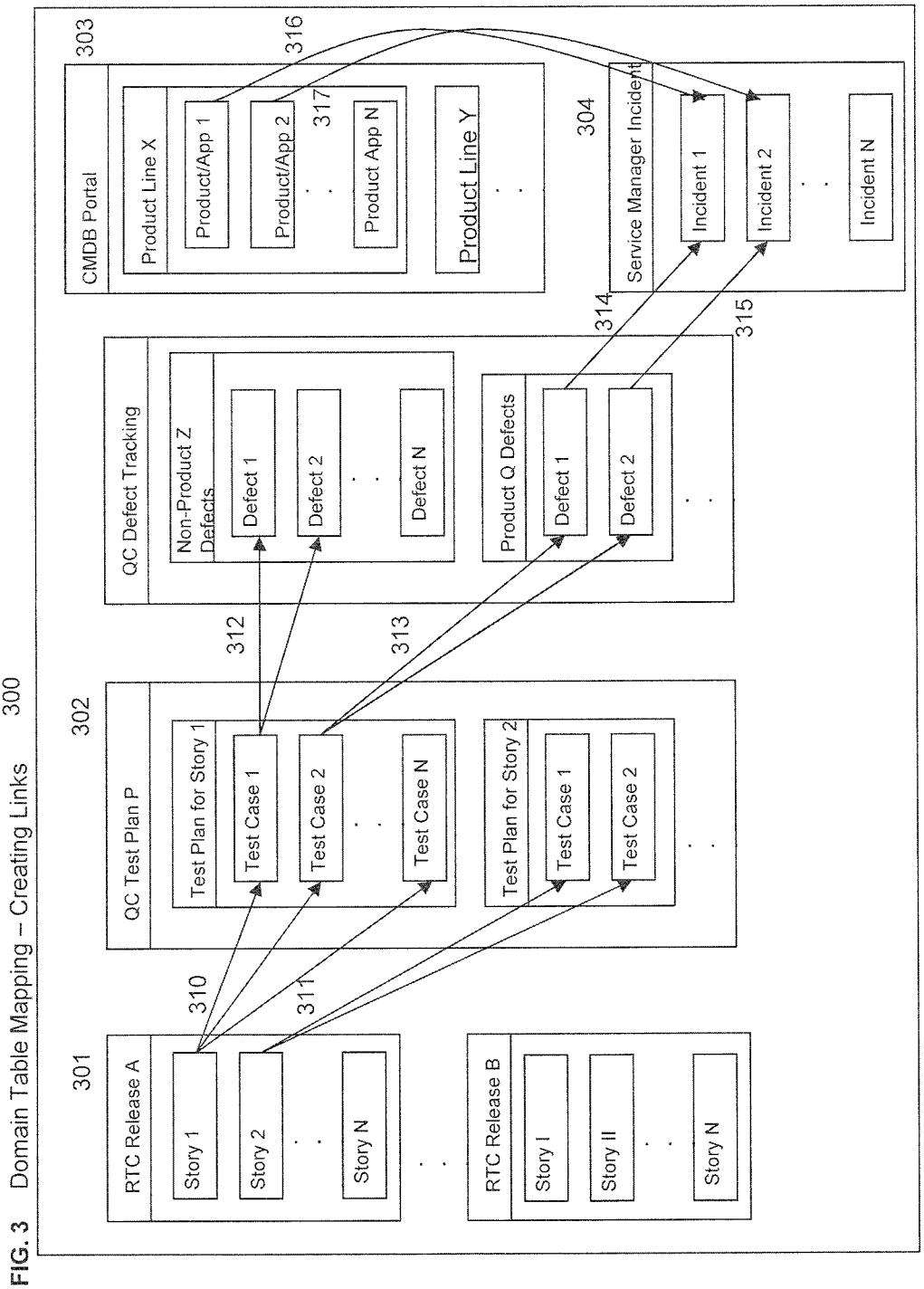
FIG. 3 is an exemplary depiction of the mapping or links created between data from a plurality of software development management tools.

FIG. 3 provides a visual representation of the links 310-317 created by the Domain Tables 136, 300 which maps 310-317 the data from one software development system 301-304 to another software development system 301-304. In some embodiments, the Domain Table 136, 300 will create links mapping data from one software development system to a plurality of software development systems. In another embodiment, more than one Domain Table 136, 300 may exist in the present system creating links between a plurality of software development systems 301-304. As shown in FIG. 3, the Domain Table 300 has links created between the RTC software development system 301 and the QC software development system 302. Specifically, FIG. 3 shows RTC 301 with several releases, Release A, Release B etc. As shown in this embodiment, a hierarchy exists for software planning purposes. A release is a set of software or a version of software that is being set for release for review or use. Within a release there are stories, which are a subset of the release and designate certain portions that make up that version or release, i.e., a story is a smaller subset of the functionality, presentation, or other task related to the software being developed. For example, if you are trying to release software that looks like sticky notes on a bulletin board, as in the present case, a release could be the creation of a GUI with sticky notes, whereas a story within that release may be the capability to move a sticky from one location on the board to another location. As a further example, the overall goal of another release may be the formulation of a summary page or metric page to determine which tasks or sticky notes have been completed, and a story within that release may be the representation of those metrics in a pie chart, and a second story in that release may be the representation of those metrics in a list. To delve further down, in one aspect, a story is made up of tasks. For example, the story regarding the capability to move a sticky note from one location on the board to another location may include the tasks of both creating the visual representation or GUI aspects of moving the sticky note object from one location to another as well as the task of updating the related merged data information contained in the sticky note based on where on the board it is moved. Tasks can further be broken up as well as required by the software development team to track the progress of the software being developed. These definitions are of course particular to each development team. Other hierarchies can include a capability which has various features, each feature has a plurality of functions, functions are split up into stories to be developed, and each story is broken up into tasks to be completed. Another hierarchy on the management side may be the product being delivered which is broken up into projects that various project teams, or delivery teams, work on with each project having several releases to be exported for review or use, and each release split into several development iterations. Notably, the terms "project team," "delivery team" and "agile team" can be used synonymously throughout the description of this invention.

For the purposes of FIG. 3, however, FIG. 3 shows a plurality of releases in RTC 301 being mapped to another system's information (QC 302) regarding software testing, defect management, product and incidents. As shown, RTC 301 or other similar software development system may only track the plurality of releases and the associated stories and tasks that are used to build that release. Another software development system may be used, however, to track the quality testing of that same software to be released. Herein, as an example, that tool can be QC 302. Therefore, the present system links the stories in the release 310, 311 to the test and testing information associated with that release.

In FIG. 3 for example, Release A has a plurality of stories, each of which must be tested for completeness, functionality, and/or stability within the software developed. Therefore, a single story, again comprised of multiple tasks may require several different tests to thoroughly test its capabilities and quality to find any defects. This is exemplified in FIG. 3, where Release A has Story 1 linked 310 to a plurality of tests, i.e., linked to Test Case 1 through Test Case N, which are tracked in the separate software development QC 302. Tests tracked in QC 302 may have a similar hierarchy as shown in FIG. 3 where Test Plan P in QC is divided into several smaller test cases, which can simply be smaller tests for smaller sets of functionality or quality aspects of the software being tested. Story 2 likewise is linked 311 to a plurality of tests, i.e., linked to Test Case 1 and Test Case 2 for the Test Plan for Story 2.

Likewise, a test case can then be related to defects found within the system during the testing phase, i.e., during implementation of the test case. These defects may be tracked in a separate system for various reasons. For example, a larger software development firm can have different personnel set up to specifically deal with defects found in the software, or a company may want to track the defect information in a separate system for the simple reason that the other system has a better tracking system allowing the company to customize how it tracks and resolves its defects. In the present system 100, these software development systems 110 can be kept separate and the information associated can be linked allowing the benefit of both the use of the individual tool as well as use of information collected from all tools. As shown in FIG. 3, the tester using Test Case 1 in the Test Plan for Story 1 has uncovered Defect 1 and Defect 2 through Defect N during testing. These defects input by the tester and/or software developer are shown here to relate to Non-Product Z. A link 312 is therefore created within the system 100 between Test Case 1 in the Test Plan for Story 1 and Defect 1 and Defect 2 related to Non-Product Z as these defects where found during Test Case 1 of the testing of the software developed. Likewise, FIG. 3 shows Story 1 with a testing plan, Test Plan for Story 1, wherein Test Case 2 of the testing uncovered Defect 1 and Defect 2 related to Product Q. Therefore Product Q and Non-Product Z defects are being tracked in the QC system 302 separate from the management of the software quality tests, however, the present system links these defects to the tests allowing an overall and more complete way to manage the development of the software.

Similarly, it is advantageous to link other related information in other software development systems. For example, FIG. 3 further shows defects tracked in the QC defect tracking system 302 linked 314-315 to the incident reports tracked in the Service Manager Incident system 304. FIG. 3 shows Defect 1 linked 314 or mapped to Incident 1, however, in another embodiment a defect can of course be linked to more than one incident. For various reasons, incident reports may be tracked in a separate software development tool than the system tracking the defects. For example, a manager may only be tracking the incident reports created from those working on or testing specific software. Such manager may not oversee or be particularly interested in the release planning, stories or test cases that led to the incident being tracked and is instead more concerned with the resolution of the incident. However, the same manager may be interested in the defects related with the incident tracked in QC 302 or the product line that the incident is associated with and tracked in the CMDB Portal system 303. Thus, again the present system provides the ability to link 310-317 between the various systems 301-304 such that the information in the various systems can be better managed and tracked for a more overall comprehensive view of the software developed, rather than the manager or user being limited to viewing or using one software tracking system at a time or managing several systems at one time. Allowing information to be viewed and manipulated in one system and then persisted back to multiple tracking systems reduces overhead, duplicate work, inconsistencies and again provides those working on the system a more comprehensive view of the development of the software from all angles, i.e., development, testing, quality, product line and more. FIG. 3 merely provides an example 300 of the links 310-317 that can be created across various software development or tracking systems 301-304. In another embodiment, more links can be created between the systems. Similarly, more systems can be linked together as well.

Figure 4:
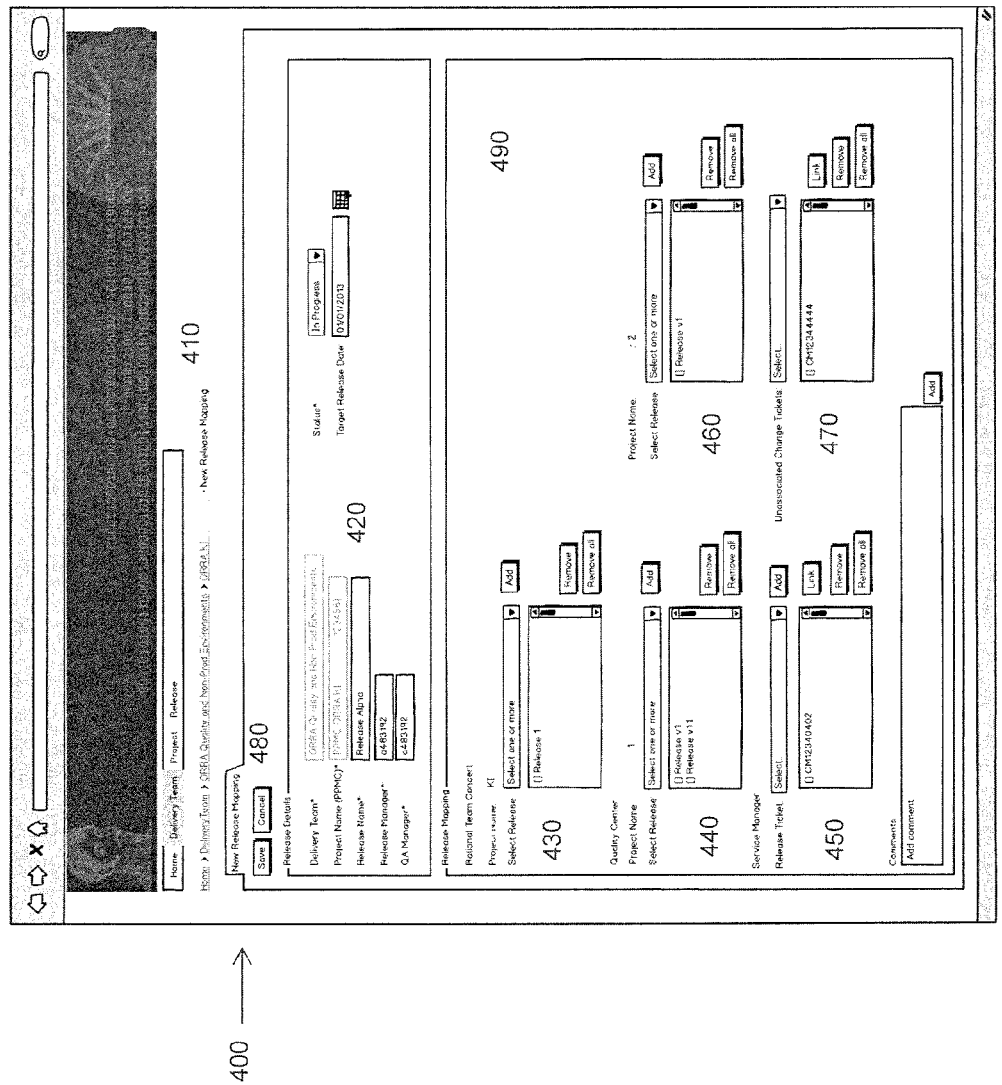
FIG. 4 is an exemplary graphical user interface for mapping the data from a plurality of software development management tools.

FIG. 4 shows one embodiment of a graphical user interface (GUI) 400 utilized by a user of the system to create the links between one software development system and another software development system, i.e., FIG. 4 is one embodiment of a GUI capable of creating the links displayed as examples 300 in FIG. 3. In one embodiment, as described in FIGS. 1 and 2, any user can have access to this type of GUI and create links between software development systems to create a Domain Table that then maps this information as the data is pulled from the individual software development systems. In another embodiment, as shown in the flow chart of FIG. 2, only predetermined users such as management, project manager, or owner can have access to this type of mapping capability.

In either embodiment, a user with access to mapping capabilities can create mapping from various views. In FIG. 4 at the top of the GUI screen 410, this GUI embodiment shows the ability to map information from a Delivery Team view, a Project view and a Release view. Note, these views are exemplary. For example, the Delivery Team is an exemplary title and can be synonymous with a Project Team or Agile Team. In another embodiment, more views may be available to map from tests in the QC or from incident reports in the Service Manager. As shown, the view selected and displayed in FIG. 4 is the Delivery Team view. Again towards the top of the GUI screen, FIG. 4 shows that the user has accessed this particular view by going into the Home page, selecting the Delivery Team view and selecting which delivery team and project to map to various release information. A particular delivery team can be associated with several projects, releases, products, quality metrics, or other information related to the development of the software. Further, these projects, releases, products, quality metrics and other information can be tracked in various software development systems. Due to difference in personnel, differences in tools or otherwise, these various pieces of the development process can even be named differently in each system. Thus, in the provided example, the user can select the delivery team, project or release 410 and map information from other software development systems to this particular delivery team. Here, the user has already selected the delivery team name and project name to map to, and the user adds in 420 the mapping information such as the release name, release manager, QA manager, status, and target release date manually into the system. In another embodiment, the user may map information related to a project or to a release. As shown as an example in FIG. 4, the user has selected to map to a Delivery Team entitled ORRA Quality and Non-Prod Environments and Project Name PPMC ORRA KI. In another embodiments, the user can specify more details regarding the project, product, tests, or other development information that the user desires to link to the particular delivery team or to a particular release.

When the user has specified what object they would like to link to, then the user can proceed to link information 490 from other software development systems. For example, as shown in FIG. 4, the user has chosen to link to the delivery team "ORRA Quality and Non-Prod Environments" and project name "PPMC ORRA KI" 420. As shown in FIG. 4, the user can map release information 490 to this delivery team from the RTC (Rational Team Concert) 430, the QC (Quality Center) 440, the Service Manager 450, to projects 460 and even to change tickets 470. By selecting the project team and project, the user is now able to select 490 the releases associated to this project in RTC, QC, Service Manager and more 430-470. In another embodiment, the GUI may provide the user the ability to map from the view of the release information or from project information 410. As shown in FIG. 4, the RTC 430 is populated with all the releases associated to the project selected. Likewise, for QC 440, the user can select from the list of all the releases in QC to link to this project. For Service Manager 450, the user can link release tickets to specific RTC iterations/releases selected and likewise link to corresponding releases in QC. In one embodiment, these release tickets can be filtered for selection for mapping according to the group or project defined. These mappings 490, however, are only saved and utilized to create links via the Domain Tables 136, 300 when the user selects to save 480 these mappings. Therefore, the user can add, edit, or remove these mappings as the user sees fit and save the changes when completed 480. In a further embodiment, the system can be configured to throw an error when a selected set of data is unable to map to the selected data of another software development system. In a further embodiment, the system can be configured to report such an error to the manager of the associated software development system from which the error was thrown such that the manager can correct the error.

As shown in FIG. 5, once the data has been read into cache as shown in FIGS. 1 and 2, and then that data has been linked or mapped as exemplified in FIGS. 3 and 4, a set of merged data 143 from a plurality of software development systems now exists that can be utilized to create GUI views 500 for the user to view, query, search, and collectively manage information from all angles of the software development process and with all the information from each of the plurality of software development systems being used by various teams at different stages of the process cycle and/or at even different geographic locations. This wealth of information is essential to highly effective oversight of the software development process. For example, FIG. 5 demonstrates that this merged data can be used to give very detailed information about a particular release, here Release Alpha, without having to look at various software development tools to determine associate stories, tasks, defects, test cases, test execution status, agile teams, managers, defect status, manager reviews and more. All this information can instead be pulled together into one intuitive GUI 500. For example, in one embodiment, this merged data can be used to provide metrics regarding the number of stories tasked and the number of stories completed 502. Likewise, the merged data can be used to provide metrics regarding the status of defects 503, or the status of test execution and pass rate 504. In other embodiments with large teams and multiple managers, the merged data can be used to help overhead determine which managers have signed off and approved a release 505. This additional oversight can help keep managers accountable by tracking managers, their projects and their approvals 506. In another embodiment, any of these metrics, charts or other information 502-509 can be clickable to drill down into further information linked to this metric information. In other embodiments, as shown here in FIG. 5, merged data can be easily utilized and reviewed by creating tree structures of the data such that the user can delve into each node to reveal specific stories 507, test cases 508, or defects 509, as shown for example, and easily manage all the information about a specific release. In another embodiment, these trees can be tailored to provide links to the specific mapping involved with the selected data. For instance, GUI screens could allow viewing of all project mappings that are in progress by a particular project team or within a particular release so these mappings can be reviewed, edited or manipulated in a similar GUI to FIG. 4. Likewise, GUI screens could allow viewing of all release mappings associated with a agile or delivery team to again allow selection of a mapping for review, editing, or manipulation by the user or users. Similarly, in another embodiment, any of the mappings, such as incident group mappings, could be presented to the user for review, editing, or manipulation.

Of course, in other embodiments, this merged data can be used in a GUI that is tailored to show different metrics or different information based on the user or based on the needs of the software development team. Such metrics can help manage the process over time by providing information about the health of the project and determine key points of interest or areas for improvement. For example, FIG. 6 provides a different embodiment 600 for viewing and managing the merged data from the plurality of software development systems. Here in FIG. 6 for example, wherein the user has already selected the group to review and defined the key performance indicators (KPI) desired, the system provides the ability to further query 601 the project data to review the metric data associated with that project. The consolidation of this information is then easy to view and utilize or even print out as needed. In this manner, the manager or user can collect a sizeable amount of information regarding a group, project, or other task without parsing through several different software development tools.

In this embodiment, the user submits a query 602 on the merged data to pull data on a specific goal and get a scorecard or status associated with the key performance indicators for each goal. Once all the data is merged 143, it can easily be queried 602 to produce such results 603 and provide an overview of the status of other process related information as well, such as projects, tasks, or releases. FIG. 6 demonstrates this ability by displaying the status information in the form of information regarding completion to target, comments, and status for example, all in one view for ease of review and management. In another embodiment, metrics are also shown 600 in the form of percentage complete and overall status 603 such as on target, minor variance and significant variance. In yet another embodiment, as shown in FIG. 6, such variance can be displayed through ease of color indication, i.e. green for on target, yellow for minor variance, and red for significant variance 604. In another aspect, the query can also call up data related to comments saved by a user regarding a particular task 603. A user might query data regarding only a certain variance for quick status about goals or tasks that are lagging behind schedule. For example, according to the exemplified GUI, the user might filter tasks in the "red" to find tasks with significant variance or off target. Again, the original information could be directly input into the various software development systems by the project team or project manager, and then the user or another user can use the present system to query merged data to retrieve metrics and stats about information from each of the plurality of software development systems to provide a quick and comprehensive overview to the user and or a manager. Further, in another embodiment, these key metrics can be tailored to compare divisions, groups, projects or other data significant or particular to the management of the development process.

In another embodiment, this merged data can also be useful by allowing the managers, developers, testers, and other team members to interactively use and manipulate the merged data as items change, issues arise or other releases, projects, stories, tasks, tests or other process development items are created, edited or deleted. Such interactive manipulation of the merged data again allows the user to have a consolidated view, and/or detailed view as needed, allowing users to add, edit and remove merged data in real-time without going into each individual software development system. After editing and saving such changes, data is persisted back to the plurality of software development systems keeping each of the systems current without duplicating effort. Such interactive manipulation is further shown and exemplified in FIGS. 7-10.

For example, FIG. 7 is an example interactive GUI 700 of a roadmap view. The roadmap view is a long term planning view which outlines all the features being developed, i.e., as shown here all the parents of stories. Therefore the roadmap view is more of an overhead view of the features and functionalities being developed. In one embodiment, shown in FIG. 7, the roadmap view visually displays the relative size of the features. For example, if one feature requires more work than another, it would be visibly shown as larger in size than the other (compare 703 to 704). As a specific example in FIG. 7, the Electrical feature in Release 1 has 4 stories and is shown as a larger feature than the Phone lines feature 703 in Release 2. In the example embodiment, each feature is listed in a column according to the release it is linked to. For example, Electrical 704 is linked to Release 1 and is therefore shown in the column for Release 1. In the particular embodiment shown in FIG. 7, each feature is in a column where each column represents a release specifically tracked in RTC. In another embodiment, the column can represent the releases provided from a different software development system. In a further embodiment, for each release, a capacity number can be set above the column 701 which sets the maximum number of features capable or potential capable for release to the client or manager in the representative release. In a further embodiment, this capacity number can be further represented by a red line or other indicator along the column as an intuitive indicator for when the maximum capacity is reached for each release. In another embodiment, when items are linked, for example when projects are linked with other work items such as stories, tasks, or tests, the GUI can be configured for further interaction and allow the user to delve into other aspects of the feature not shown, similar to the tree structures described above. For example, a user can double click the feature to see the stories in that feature such that the column expands and contracts to show the details in each feature. In a further embodiment, the features can be color coded for status, priority, release, group or other aspect that helps visually represent information to the user.

In another embodiment, these features can be interactive and be dragged and dropped into another release as a way to interactively manipulate the data in the feature as well as the information linked to the feature. For example, if the Electrical feature 704 will not be started until Release 2, then the user can drag 705 the Electrical feature 704 directly into the column for Release 2 such that the feature information and all related information and links are updated automatically for inclusion in Release 2. These updates are saved or persisted back to the underlying software development systems when the user saves these changes. Similarly, in another embodiment, if the user opens up one of the features and manually edits information associated with the feature, such as changes the stories linked to the feature, this information is also updated in the underlying software development systems when the user saves these changes. Again, this interaction saves the user time and prevents duplicating work and creating inconsistencies created when the user has to go into several different systems to ensure the information is updated correctly into each system as appropriate. This additional saves, for example, a high level manager from having to know which system or systems to even update the data to in situations where the data may only be applicable to one or a few systems. The ease of interaction and updating information across a plurality of software development systems results in improved oversight and management of the development process.

In another embodiment, the features, stories, or tasks can be displayed in the form of a plurality of electronic sticky notes on an electronic sticky board such as in FIGS. 8-10. In these interactive views, similar to the interactive feature of FIG. 7, the individual tasks are represented as a sticky note on the sticky board in a location representing the relationship between the task or information of the sticky note and the release or phase in the timeline of the project. The sticky note can be representative of a feature, story, task or other sub-task as configured in the software development systems. Similar to their physical counterpart in the agile process, these sticky notes can be moved around on the electronic sticky board to change their representative meaning. For example, in FIG. 8, if the user decides that the work for Cut Hole in Wall 805 should be assigned to Release 3, the user can drag 810 the Cut Hole in Wall story 805 sticky note to the sticky board under Release 3 for the appropriate work item. In this interactive example, the user instantly updates all the information for the sticky note and Release 3 without going into individual tools to update the information. Further, this interactive view allows agile teams to easily adapt to this new system and interact within teams and locations easily and in a way that embraces the agile development culture. In one embodiment, the work item hierarchy is listed along the left hand side of the columns 800 creating a grid like structure which further defines the information in a sticky note when it is placed on the board. For example, the Build task 801 and the Buy receiver and cables task 802 are related to the Sound System in the work hierarchy 800, however the Build task 801 is in the backlog and Buy receiver and cables is related to Release 2. In this example, the sticky note for Cut Hole in Wall 805 would be updated to link to information regarding the work item Cable Ethernet 806 if the sticky note was placed in this row 803. The data for this sticky note or story is then updated to be linked to Release 3 and work item Cable Ethernet 806. If however, the user decides the Cut Hole in Wall story 805 sticky notes can be worked on in Release 1, the interactive view allows the user to move the story to a previous release by again dragging and dropping the sticky note in the column for Release 1. This approach easily corresponds to the Daily Standups typically conducted in person during the agile process, but allows, importantly, users and or teams in geographically dispersed locations to interact in the typical agile manner without the impact of different locations, teams or tools. In another embodiment, the user can simply click on the sticky note to bring up the information linked to the sticky note and the user can manipulate the linked information in this manner as well.

In FIG. 8, similar to FIG. 7, the title bars at the top of the columns aggregate the feature or story data to indicate the amount of work being done in the release. Also, similar to FIG. 7, the sticky notes size can be configured to be proportional to the amount of work or time to completion associated with the story or task. Likewise, the sticky notes can be configured to be color coordinated to link the story or task to a status, priority level, personnel, team, requirement, test, integration, release, or other information related to the development process. In one embodiment, as shown in FIG. 8, the sticky notes are color coded 807 to show what priority the work has, i.e., low, medium, high, critical, or an unassigned priority. In another embodiment, by updating a sticky note's information by editing the location, size, color or other linked information by opening the sticky note and editing the associated textual information, the information will be updated and persisted back to the originating software development system when the user selects to save the changes 808. In another embodiment, the user can also double click the sticky note to edit the information associated with the sticky note.

In another embodiment, the user can double click the release column to further delve into the iterations associated with that particular release. For example, if the user double clicked Release 1 column 809, the user would be navigated to the iteration planning view for Release 1. The iteration planning view, shown in FIG. 9, is another embodiment that features the sticky notes. Similar to the release planning view, the iteration planning view 900 allows the user to interactively manipulate the merged data from the software development systems via the use of sticky notes or by clicking on the sticky notes and manually entering the informational changes. This view 900, however, is delving down another layer into the development process. As shown in FIG. 9, the sticky notes are shown on a story board 901, or sticky board, and can be filtered 902 or displayed according to size, priority, and even by iterations. Similar to the release planning view the sticky notes size can be configured to be proportional to the work load, and the color or location can be configured to conform to its priority level in the iteration. Likewise, the sticky notes are interactive and can be dragged 906 and dropped in different locations representing a different status within the selected iteration. For example, when the developer begins working on the story represented by the sticky note Contact ISP 903, the developer can enter the system, select the iteration Zeta_iteration and move 906 the sticky note for Contact ISP 903 from the Not Started column to the In Progress column 904. Again, as a further example, when the developer has completed the tasks within the story story Contact ISP 903, the developer can enter the system 100 again and move the sticky note for Contact ISP 903 from the In Progress column 904 to the Completed Column 905. This action, for example, can take place while the developer is working and the developer can sign on the system 100 to update his progress on his work. Alternatively, as a further example, the developer can sign on to the system 100 during a Daily Standup session together with other users of the system and edit this data in the presence or view of the other users to show his progress.

In this interactive manner, the developer updates his work and saves the information back to the necessary software development systems without the need to go into each software development system and individually update the information in each system, and or in a manner consistent with the agile method. Of course, the developer's updates can then be seen by other members of the development team or manager such that the other members know that those tasks for the Contact ISP story 903 have been completed 905. The completed story and tasks will then also be available for other users and managers in the completion and metric information exemplified in FIGS. 5 and 6, or available for the other users to view during an interactive session. Again, in this manner, the entire team stays informed and updated with current information that is directly useful and important in managing the development process.

Again, the sticky note interactive process is particularly helpful for the agile process where agile or project team members like to participate in Daily Standup sessions. In the physical Daily Standup session, each team member goes in front of the other team members to explain the status of his work, and if appropriate, moves or updates the sticky notes on the board. With this interactive electronic version, team members in remote locations can easily participate in the same activity by actively moving their sticky notes 906 and/or updating the information contained in each. Not only are team members updating their sticky notes in the fields on the screen in real-time, but when the session is completed and the changes are saved, all the changes are persisted back to the originated software development systems without the extra work of the team members then manually updated the individual systems, as would be done after a typical session. Also, team members can continue to use the software development systems that they are accustomed to working with on a daily basis because these systems are not replaced by the present interactive system. Rather, users can utilize their own development systems yet still participate in the interactive sessions with their peers without having to be in the same location, without having to duplicate work, and without having to transcribe work into various software development systems which can lead to errors and inconsistencies. Thus, the present system allows and improves the collaborative methodologies of the agile process by providing quicker updates to all systems, keeping current information, keeping team members informed, and keeping remote team members interactive, while still preserving the processes already in place for software development teams via various third party software development tools.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a World Wide Web browser (e.g., Microsoft® Internet Explorer® available from Microsoft Corporation, Mozilla® Firefox available from Mozilla Corporation).

One skilled in the art will realize the technology can be embodied in other specific forms without departing from the spirit or essential characteristics thereof. The foregoing embodiments are therefore to be considered in all respects illustrative rather than limiting of the technology described herein. All changes that come within the meaning and range of equivalency of the claims are therefore intended to be embraced therein.

What is claimed is:

1. A computer implemented software development planning and management system operative across a plurality of distinct software development systems, the system comprising:
    a plurality of application programming interfaces, wherein at least two application programming interfaces are associated with at least two of the plurality of distinct software development systems, respectively, each application programming interface capable of retrieving data from and saving data to its respective software development system, the plurality of software development systems including quality control systems, project management system, service manager systems, or any combination thereof;
    at least one repository that contains the retrieved data from the at least two of the plurality of distinct software development systems, wherein the at least one repository is a temporary location for caching the retrieved data;
    at least one domain table that maps the retrieved data from the at least two of the plurality of distinct software development systems to data retrieved from one or more other software development systems to create a set of integrated data;
    a data management module that caches changes to the set of integrated data in the at least one repository, and upon user selection to save changes, records changes to the set of integrated data via the at least two plurality of application programming interfaces to the at least two associated software development systems, respectively, from which the data was retrieved such users of the each of the at least two associated software development can use the recorded changes and upon ending of a session deletes the cached changes to the set of integrated data in the at least one repository.

2. A computer implemented method for administering a software development planning and management system, the system including a plurality of distinct software development systems, each software development system having a distinct data model, the method comprising:
    providing a plurality of application programming interfaces, at least two application programming interfaces are associated with at least two of the plurality of distinct software development systems, respectively, and capable of retrieving data from and saving data to its respective software development system of the two of the distinct plurality of software development systems, the plurality of software development systems including quality control systems, project management system, service manager systems, or any combination thereof;
    establishing, via a computing device, a session;
    receiving, via each application programming interface of the at least two application programming interfaces, a set of data retrieved from its respective software development system of the two of the distinct plurality of software development systems;
    caching, via a data repository, the set of data retrieved from each of the two of the plurality of software development systems, wherein the data repository is a temporary memory location;
    forming, via a data management module, a set of integrated data by creating a plurality of at least one domain tables that map the set of data retrieved from each of the two of the plurality of software development systems to the set of data retrieved from one or more other associated software development systems;
    caching, using the data management module, changes to the set of integrated data in the data repository;
    saving, upon user selection, via the at least two plurality of application programming interfaces, changes to the set of integrated data through the at least two associated application programming interface to each of the at least two associated software development systems from which the data was originally retrieved such that users of the at least two associated software development systems can use the saved changes; and
    deleting changes to the set of integrated data cached in the data repository when the session ends.

3. The computer implemented method of claim 2 further comprising caching, via a plurality of data repositories, the set of data retrieved from each of the associated software development systems.

4. The computer implemented method of claim 2 further comprising:
    establishing, via a plurality of remote computing devices, a plurality of sessions by a plurality of users, wherein the plurality of users change the set of integrated data in real-time;
    caching, via the data management module, changes to the set of integrated data in the data repository; and
    saving, upon user selection, via the plurality of application programming interfaces, changes to the set of integrated data through the associated application programming interface to each of the associated software development systems from which the data was originally retrieved.

5. The computer implemented method of claim 4 further comprising:
    refreshing a session from the plurality of sessions via the data management module upon a user selection to refresh;
    discarding, via the data management module, the set of data retrieved from each of the associated software development systems;
    retrieving, via the plurality of application programming interfaces, a new set of data from each of the associated software development systems, the new set of data containing changes from the plurality of users;

caching, via the data management module, the new set of data from each of the associated software development systems in the data repository;

forming, via the data management module, a new set of integrated data by creating a plurality of domain tables that map the new set of data retrieved from each of the associated software development system to the new set of data retrieved from each of the other associated software development systems; and caching, via the data management module, changes to the new set of integrated data in the data repository; and saving, upon user selection, via the plurality of application programming interfaces, changes to the new set of integrated data through the associated application programming interface to each of the associated software development systems from which the data was originally retrieved.

6. The computer implemented method of claim 2 further comprising throwing, via the data management module, an error when the set of data retrieved from each of the associated software development systems does not map to the set of data retrieved from each of the other associated software development systems.

7. The computer implemented method of claim 6 further comprising automatically sending, via the data management module, a report to a manager of the associated software development system when the error is thrown.

8. The computer implemented method of claim 2 further comprising:

querying based on user input, via the data management module, the set of integrated data; and providing, via the data management module, a query report containing information queried from the set of integrated data.

9. The computer implemented method of claim 2 further comprising providing, via the data management module, a display view of the set of integrated data wherein a user associates a sub-set of the set of integrated data to at least one task to be completed.

10. The computer implemented method of claim 9 further comprising:

creating, via the data management module, at least one task to be completed, wherein the user associates the at least one task to software development information, the software development information including at least one of a phase in a timeline, sub-task, status, priority level, task size, personnel resource, team, software requirement, software quality testing task, software integration task, software release task, release date, software defect or any combination thereof;

updating, via the data management module, the sub-set of the set of integrated data based on the associated software development information, wherein the data management module caches changes to the sub-set of the set of integrated data in the data repository; and saving, upon user selection via the plurality of application programming interfaces, changes to the set of integrated data through the associated application programming interface to each of the associated software development systems from which the data was originally retrieved.

11. The computer implemented method of claim 10 further comprising providing, via the data management module, a display view of the plurality of tasks to be completed in the form of a plurality of sticky notes on a sticky board, wherein a sticky note contains at least one task to be completed and the associated software development information, and the sticky board is a grid of cells, each cell representing a relationship between the sticky note placed in the cell and at least one of the phase in the timeline, sub-task, status, priority level or any combination thereof.

12. The computer implemented method of claim 11 further comprising displaying, via the data management module, the sticky notes varying in size, the size of the sticky note proportional to an estimated amount of time needed to complete the associated at least one task.

13. The computer implemented method of claim 12 further comprising displaying, via the data management module, the sticky notes varying in color, the color of the sticky note representing a relationship between the sticky note and at least one of the phase in the timeline, sub-task, status, priority level, personnel resource, team, software requirement, software quality testing task, software integration task, software release task, release date, software defect or any combination thereof.

14. The computer implemented method of claim 11 further comprising displaying, via the data management module, the sticky note at a location within a cell, the location of the sticky note within the cell representing a relationship between the sticky note placed in the cell and at least one of the phase in the timeline, sub-task, status, priority level, personnel resource, team, software requirement, software quality testing task, software integration task, software release task, release date, software defect or any combination thereof.

15. The computer implemented method of claim 11 further comprising:

providing, via the data management module, an interactive display view of the plurality of sticky notes, wherein the user drags at least one of the sticky notes from a first cell on the grid to a second cell on the grid;

updating, via the data management module, the software development information of the dragged sticky note based on the change in position of the sticky note from the first cell to the second cell, wherein the data management module caches changes to the sub-set of the set of integrated data in the data repository; and saving, upon user selection via the plurality of application programming interfaces, changes to the set of integrated data through the associated application programming interface to each of the associated software development systems from which the data was originally retrieved.

16. The computer implemented method of claim 11 further comprising:

providing, via the data management module, an interactive display view of the plurality of sticky notes, wherein the user changes the size of at least one of the sticky notes;

updating, via the data management module, the software development information of the at least one sticky note based on the change in size, wherein the data management module caches changes to the sub-set of the set of integrated data in the data repository; and saving upon user selection, via the plurality of application programming interfaces, changes to the set of integrated data through the associated application programming interface to each of the associated software development systems from which the data was originally retrieved.

17. The computer implemented method of claim 11 further comprising:

providing, via the data management module, an interactive display view of the plurality of sticky notes, wherein the user changes the color of at least one of the sticky notes;

updating, via the data management module, the software development information of the at least one sticky note based on the change in color, wherein the data management module caches changes to the sub-set of the set of integrated data in the data repository; and saving upon user selection, via the plurality of application programming interfaces, changes to the set of integrated data through the associated application programming interface to each of the associated software development systems from which the data was originally retrieved.

18. The computer implemented method of claim 11 further comprising:

providing, via the data management module, an interactive display view of the plurality of sticky notes, wherein the user changes the text of at least one of the sticky notes;

updating, via a data management module, the software development information of the at least one sticky note based on the change in text, wherein the data management module caches changes to the sub-set of the set of integrated data in the data repository; and saving upon user selection, via the plurality of application programming interfaces, changes to the set of integrated data through the associated application programming interface to each of the associated software development systems from which the data was originally retrieved.

19. The computer implemented method of claim 11 further comprising providing, via the data management module, an interactive display view of the plurality of sticky notes, wherein the user filters the sticky notes on a sticky board by at least one of the phase in a timeline, sub-task, status, priority level, task size, personnel resource, team, software requirement, software quality testing task, software integration task, software release task, release date, software defect or any combination thereof.

20. The computer implemented method of claim 10 further comprising displaying, via the data management module, text relating to the at least one task on the created sticky note.

21. The computer implemented method of claim 20 further comprising displaying on the created sticky note, via the data management module, text relating to at least one of the phase in the timeline, sub-task, status, priority level, personnel resource, team, software requirement, software quality testing task, software integration task, software release task, release date, software defect or any combination thereof.

* * * * *